No. 886,734. PATENTED MAY 5, 1908.
A. SMITH.
WAGON OR TRUCK.
APPLICATION FILED APR. 24, 1907.
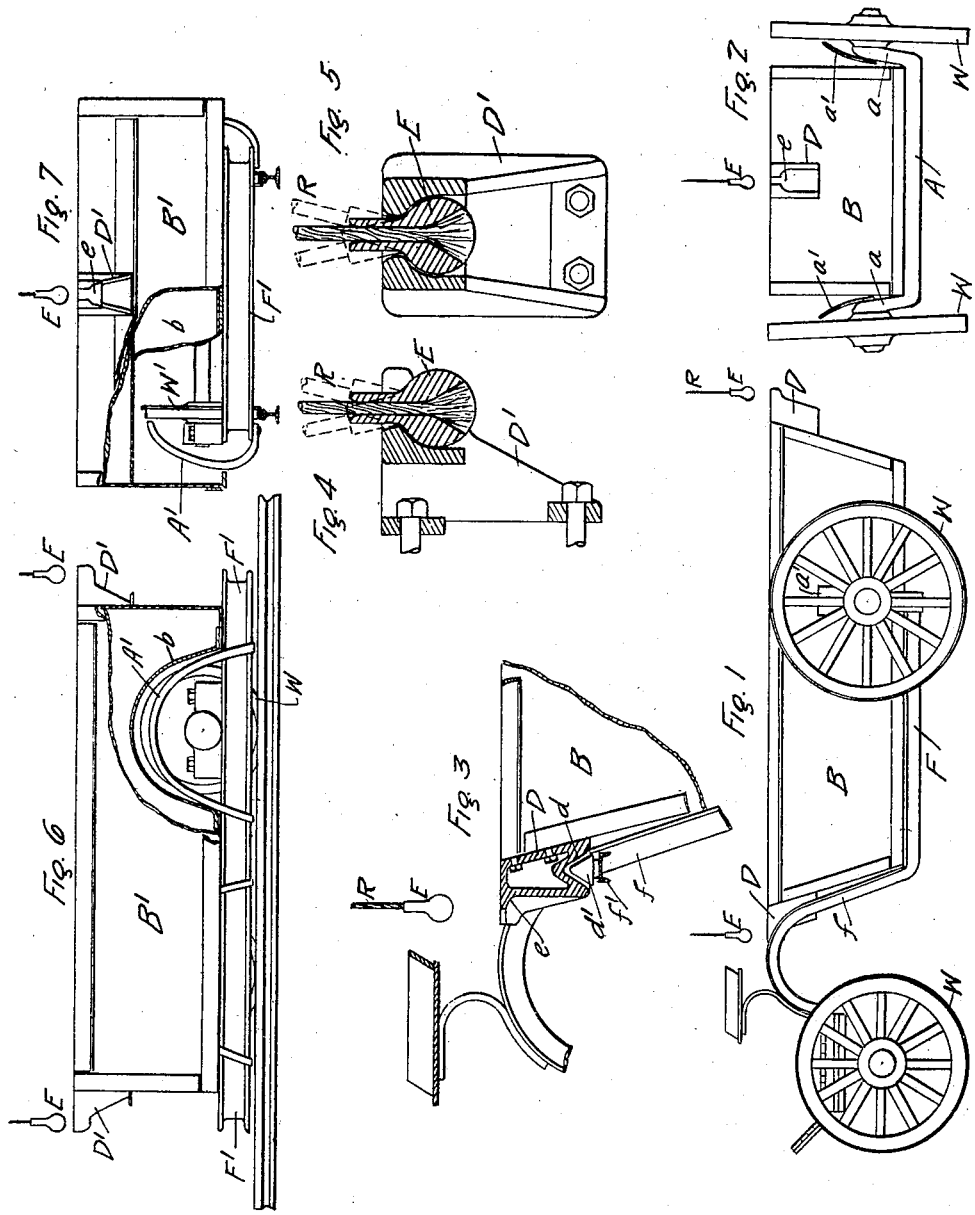

UNITED STATES PATENT OFFICE.

AUGUSTUS SMITH, OF NEW YORK, N. Y., ASSIGNOR TO BERGEN POINT IRON WORKS, OF NEW YORK, N. Y., A CORPORATION OF NEW JERSEY.

WAGON OR TRUCK.

No. 886,734.      Specification of Letters Patent.      Patented May 5, 1908.

Application filed April 24, 1907. Serial No. 369,993.

*To all whom it may concern:*

Be it known that I, AUGUSTUS SMITH, a citizen of the United States of America, and a resident of the borough of Manhattan, in the city, county, and State of New York, have invented a certain new and Improved Wagon or Truck, of which the following is a specification.

The main object of my invention is to so construct a wagon or truck that the body of the wagon or truck may be readily hoisted from its wheeled frame for the dumping of the load, and the body as readily replaced on its frame. This object I attain by the construction hereinafter described.

In the accompanying drawings Figure 1 is a side elevation of a four-wheeled wagon or cart, embodying my invention; Fig. 2 is an end view of the same; Fig. 3 is a view of a detail drawn to a larger scale; Figs. 4 and 5 are sectional views drawn to a still larger scale, showing the preferred means of connecting up the hoisting ropes; Fig. 6 is a side elevation; and Fig. 7 is an end elevation, both partly in section, of a truck or wagon to run on rails, and embodying my invention.

Referring to Figs. 1 and 2, W are the four wheels of a truck or wagon, adapted to run on ordinary streets or roads, and having a frame F preferably made of angle or channel iron, with a dropped axle A (Fig. 2) for the rear wheels, and upwardly inclined bars $f$ towards the forward wheels, (Fig. 1). The body B of the wagon is to be freely supported upon the low frame F with its rear dropped axle A thus constructed, and as shown in Figs. 1 and 2. The upright parts $a$ of the dropped axle may be flared as shown in Fig. 2 and additional flaring guards $a^1$ may be mounted above the parts $a$ to guide the body B into place when it is lowered onto the frame by the hoisting and lowering means. So the inclined portion $f$ of the forward part of the frame will come to guide the body to its proper position on the frame in a longitudinal direction.

To hold the body B in place longitudinally on the frame, I prefer to provide the device shown in Fig. 3, and comprising an upright pin $d^1$ on one part to enter a recess $d$ on the other part. In the present instance I have shown the pin $d^1$ as mounted on the wagon frame (on a cross bar $f^1$ thereof) while the recess $d$ is formed in a casting D attached to the forward end of the wagon body, and both pin and recess are preferably coned as shown, to facilitate the self-positioning of the wagon body when it descends onto its frame.

I prefer to provide the wagon body with the construction of hoisting rope connections shown on a larger scale in Figs. 4 and 5. Secured to the end of each wire hoisting rope R is a ball E, and on each end of the wagon body about midway of its width is secured a casting or forging D or D' formed with a ball socket $e$ open at the end for the ready insertion or removal of the ball E. The parts thus constructed are more easily and quickly attached and detached, and less liable to breakage than a hook and eye connection and yet allow a wagon body to tip a little without danger if unevenly loaded. This construction is especially useful in connection with hoisting and dumping mechanisms of the type described in the Morris patent 699,806, May 13, 1902.

In Figs. 6 and 7, I have shown my invention as applied to a truck or wagon to run on rails, the rectangular frame $F^1$ being mounted upon wheels $W^1$ in any suitable way, but preferably the frame is arranged below the level of the axles of the wheels, as shown. The body $B^1$ is accordingly formed with transverse hoods $b$ (Figs. 6 and 7) in its bottom, forming chambers to receive the wheels. Adjacent to the wheels and outside of them, I mount upon the frame inclined and curved guides $A^1$ which enter the hoods and serve to center the body $B^1$ or guide it into position both laterally and longitudinally when the body is lowered onto the wheeled frame.

I provide the body $B^1$ with the same ball and socket connections with the hoisting ropes as in the case of the wagon shown in Figs. 1 to 3.

I claim as my invention

1. The combination of the wheeled frame of a wagon with a removable body adapted to be hoisted off the frame and means for centering or guiding the body into position both laterally and longitudinally when lowered again onto the frame.

2. The combination of the wheeled frame of a wagon with a removable body adapted to be hoisted off the frame, and ball and socket connections between the hoisting ropes and the opposite ends of the body.

3. The combination of a wheeled frame having a dropped rear axle and upwardly inclined parts forward with a wagon body removable from the frame and adapted to be guided to position by said inclined parts when the body is lowered onto the frame, and means for retaining the body in place longitudinally of the frame.

4. The combination of a wheeled frame having a dropped rear axle and upwardly inclined parts forward with a wagon body removable from the frame, and a conical pin and recess connection on the frame and body to guide and return the latter in position.

In testimony whereof I have signed my name to this specification, in the presence of two subscribing witnesses.

AUGUSTUS SMITH.

Witnesses:
   WALTER ABBE,
   HUBERT HOWSON.